United States Patent
Kopton (10) Patent No.: US 10,369,639 B2
(45) Date of Patent: Aug. 6, 2019

(54) TOOL FOR ROUGHENING A METALLIC SURFACE

(71) Applicant: AUDI AG, Ingolstadt (DE)

(72) Inventor: Peter Kopton, Kösching (DE)

(73) Assignee: Audi AG, Ingolstadt (DE)

( * ) Notice: Subject to any disclaimer, the term of this patent is extended or adjusted under 35 U.S.C. 154(b) by 491 days.

(21) Appl. No.: 15/310,321

(22) PCT Filed: Apr. 29, 2015

(86) PCT No.: PCT/EP2015/000873
§ 371 (c)(1),
(2) Date: Nov. 10, 2016

(87) PCT Pub. No.: WO2015/172864
PCT Pub. Date: Nov. 19, 2015

(65) Prior Publication Data
US 2017/0291234 A1   Oct. 12, 2017

(30) Foreign Application Priority Data
May 13, 2014 (DE) .................. 10 2014 006 845

(51) Int. Cl.
*B23B 29/034* (2006.01)
*B23D 13/06* (2006.01)
*B23B 41/12* (2006.01)
*B23D 13/00* (2006.01)
*B23P 9/00* (2006.01)
*B23P 9/02* (2006.01)

(52) U.S. Cl.
CPC ........ *B23D 13/06* (2013.01); *B23B 29/03464* (2013.01); *B23B 41/12* (2013.01);
(Continued)

(58) Field of Classification Search
CPC .... B23G 1/00; B23C 5/00; B23C 5/02; B23C 5/12; Y10T 29/49886; Y10T 29/4511; Y10T 29/49707
See application file for complete search history.

(56) References Cited

U.S. PATENT DOCUMENTS

| 6,224,301 B1 | 5/2001 | Kress et al. |
| 2014/0050544 A1* | 2/2014 | Nedzlek .................. B23C 3/124 408/1 R |

(Continued)

FOREIGN PATENT DOCUMENTS

| CN | 103381496 A | 11/2013 |
| CN | 103706860 A | 4/2014 |

(Continued)

OTHER PUBLICATIONS

International Search Report issued by the European Patent Office in International Application PCT/EP2015/000873.

(Continued)

*Primary Examiner* — Jason L Vaughan
*Assistant Examiner* — Amanda Kreiling
(74) *Attorney, Agent, or Firm* — Henry M. Feiereisen LLC (57) ABSTRACT

A roughening tool for roughening a metallic surface of an inner wall of a pre-drilled workpiece bore is disclosed. The roughening tool has a profiled contour provided between the tool clamping shaft and the tool tip. With this contour, a roughened structure can be produced through rotation of the tool by processing the metallic surface in a material removing or non-material removing manner The roughening tool includes at least one profiled web which extends along the tool axis, protrudes from a main tool part, and on whose outer web back the profiled contour is provided.

18 Claims, 5 Drawing Sheets

(52) U.S. Cl.
CPC ................ *B23D 13/00* (2013.01); *B23P 9/00* (2013.01); *B23P 9/02* (2013.01)

(56) References Cited

U.S. PATENT DOCUMENTS

| | | |
|---|---|---|
| 2014/0294526 A1 | 10/2014 | Kopton |
| 2015/0158132 A1 | 6/2015 | Kopton |
| 2015/0266114 A1 | 9/2015 | Kopton |

FOREIGN PATENT DOCUMENTS

| | | |
|---|---|---|
| DE | 10 2008 024 313 | 12/2009 |
| DE | 10 2009 006 694 | 8/2010 |
| DE | 10 2011 001 772 | 6/2012 |
| DE | 10 2012 002 050 | 8/2012 |
| DE | 10 2012 105 183 | 12/2013 |
| DE | 10 2013 108 604 | 2/2014 |
| DE | 10 2012 021 089 | 6/2014 |
| JP | 2001-506928 | 5/2001 |
| JP | 2006-97045 | 4/2006 |

OTHER PUBLICATIONS

Chinese Search Report issued by the Chinese Patent Office in Chinese Application No. 2015800247083.

Translation of Chinese Search Report issued by the Chinese Patent Office in Chinese Application No. 2015800247083.

* cited by examiner

TOOL FOR ROUGHENING A METALLIC SURFACE

CROSS-REFERENCES TO RELATED APPLICATIONS

This application is the U.S. National Stage of International Application No. PCT/EP2015/000873, filed Apr. 29, 2015, which designated the United States and has been published as International Publication No. WO 2015/172864 and which claims the priority of German Patent Application, Serial No. 10 2014 006 845.5, filed May 13, 2014, pursuant to 35 U.S.C. 119(a)-(d).

BACKGROUND OF THE INVENTION

The invention relates to a roughening tool for roughening a metallic surface of an inner walling or a pre-drilled workpiece core-bore and a method for roughening such a surface.

Such a roughening tool is used in vehicle construction for example for producing a cylinder head bore of a lightweight metal internal combustion engine made of aluminum or magnesium alloys. In order to increase wear resistance of the Al/Mg cylinder running surfaces of such an internal combustion engine a wear-resistant coating can be applied on the cylinder running surfaces in a thermal spray process.

For improving adhesiveness, the metal surface can be roughened with microscopic undercuts so as to form a roughened structure prior to applying the wear resistant coating. The roughening can for example be accomplished chemically or by laser treatment. As an alternative also a mechanical roughening can be used as it is known form DE 10 2009 006 694 A1 or from DE 10 2008 024 313 A1. In such a generic mechanical roughening process a roughening tool is used that has on the outer circumference a profiling contour with which a predefined roughened structure can be generated with the tool rotation by material removing or non material removing forming of the metallic surface. Thus in DE 10 2008 024 313 A1 the roughened structure is provided in two working steps, i.e., first in a first step in which undercuts are introduced into the metallic surface by material removal and/or embossing, and a second processing step in which the pre-forms are for example deformed by upsetting in a non-material removing process step.

SUMMARY OF THE INVENTION

The roughening tools known from the state of the art and the roughening methods that can be performed therewith are cost-intensive and are associated with high tool costs and high processing time during the roughening.

It is an object of the invention to provide a roughening tool for roughening a metallic surface of an inner walling of a pre-drilled workpiece core bore which generates a high quality roughened structure on the inner walling of the workpiece core bore while at the same time requiring less energy and/or time.

The object is solved by the features of the respective independent patent claims. Preferred refinements of the invention are disclosed in the dependent claims.

The invention is based on the problem that with the roughening tools known from the state-of-the-art generating the roughened structure is time and energy intensive. Before this background, according to the characterizing portion of claim 1 the roughening tool is provided with at least one profiling web, which extends along the tool axis and protrudes radially outwards from a tool base body. The profiling contour for generating the roughened structure is formed on the outer circumference-side back of the profiling web. In addition the profiling web has on the tool tip of the roughening tool a groove blade. The groove blade is oriented transverse to the tool axis and directly on the tool tip.

With such a roughening tool the roughened structure can be generated in two processing steps: in a first pre-processing step a profiling groove, which extends along the core-bore axis, is first cut into the core-bore inner walling by means of the grove blade of the profiling web. The formation of the profiling groove in the core-bore inner walling is for example accomplished by an axial lift movement of the boring tool in the core bore. In this case the roughening tool is inserted into the core bore in a "threading boring mode" with low rotational speed. In this case the profiling web does not extend straight along the tool axis but extends spiral-shaped about the tool axis with a angle of twist. The rotational speed is hereby adjusted to the angle of twist of the profile web. After the first pre-processing step, i.e., in the inserted state into the core bore, the profiling web is now in engagement with the profile groove, i.e., it is arranged in the profile groove over the entire processing length (profiling length).

In a second subsequent profiling step the profiling contour of the roughening tool can then roughen the metallic surface of the inner walling of the core bore through rotation of the tool. For the final processing step a high rotational speed is not required but rather, due to the absent or at least strongly reduced axial thrust, only a low rotational speed. For example in the case of two diametrically opposed profile webs, which are configured point symmetrical with respect to the tool axis, only at least half a revolution of the roughening tool is required initially. Subsequently the roughening tool can be removed from the surface-processed core bore. In this way the roughening process is significantly more energy efficient and requires less time.

Of note, the pre-processing step as well as the profiling step are performed without tool change, i.e., with a single roughening tool. The at least one profiling web and the at least one drilling-out step described below can be formed one-piece with the tool base body and/or be of the same material as the base body. As an alternative the profiling and drilling-out webs can also be formed on separate processing plates, which are detachably fastened on the tool base body.

As mentioned above in the pre-processing mode the at least one spiral-shaped profiling groove was generated in the core-bore inner walling in a "threading bore mode". This means that during the generation of the spiral-shaped profiling groove the roughening tool is moved into the cylindrical core bore with axial forward speed and a slow rotation about its tool axis (i.e. dependent on the groove slope), i.e., so that a continuous groove path results and the profiling web is in engagement with the generated profiling groove.

In the following the tool geometry of the roughening is described: the groove blade of the profiling web can have a groove base blade edge which converges with the main cutting edge at a first blade corner. In addition the profiling web can have an outer circumference-side free surface in the region of the tool tip, which free surface converges at the groove base cutting edge with a groove chip surface. The groove chip surface pushes the chippings generated during the pre-processing step into the groove shaped chip space extending along the tool axis and from there further in the direction out of the core bore.

The above mentioned groove chip surface is delimited by the groove cutting edge and also by the first and second groove wall cutting edges. The groove wall cutting edges transition at the first blade corner and at the second blade corner into the groove base cutting edge. At the first blade corner thus overall a profiling cutting edge, the first groove wall cutting edge and the groove base cutting edge converge.

As mentioned above, for reducing mechanical stress on the bore tool it is preferred when the profiling groove introduced in the pre-processing step into the core-bore inner walling is not straight but spiral-shaped. Correspondingly the profiling web extends spiral-shaped with an angle of twist about the tool axis. In this case the profiling groove is cut spiral-shaped into the core-bore inner walling with the translational lift movement as well as with a rotational movement of the roughening tool that is adjusted to the angle of twist (i.e. in the threading mode).

For proper removal of the groove chippings it is preferred when the groove cutting edge is positioned obliquely with a predetermined work angle with respect to a plane that is perpendicular relative to the tool axis. The work angle is preferably selected so that when viewed in the direction of rotation the leading first blade corner is spaced apart from the tool tip by an axial offset. The above-mentioned second blade corner can preferably end approximately flush at the optionally flat tool tip.

With regard to a proper operation it is important that the groove chippings, which are generated during the pre-processing step, are reliably removed from the core bore. For such a reliable removal of the groove chippings the grove chip surface of the groove blade can be extended radially inwards with a chip guiding surface. Via the chip guiding surface the groove chippings, which are generated during the groove cutting, can be easily pushed into the chip space, which extends along the tool axis. In a constructive embodiment the chip guiding surface, which extends the groove chip surface radially inwards, can be formed by a corner recess at the transition between the tool tip and the chip space.

Preferably the profiling web of the groove blade can have a web depth in the region of the groove blade at the tool tip, which is greater than the web depth/profile height of the profiling contour. This means that the tool diameter at the groove blade is greater than the tool diameter at the profile contour. This ensures that in the pre-processing step the profiling contour, which trails behind the groove blade in insertion direction, can be inserted load-free into the profiling groove.

The core-bore of the workpiece can initially be pre-drilled subject to tolerances by means of a separate boring tool. Prior to performing the roughening process the core bore can then be drilled out to a final diameter. In a particular embodiment the drilling out process may be performed simultaneously with the roughening process instead of in a separate process step. To this end at least one drilling-out blade can be provided in addition to the at least one profiling web, which drilling-out blade extends along the tool axis and protrudes radially outwards from the tool base body. The drilling-out blade can have a drilling-out web, which has a chip surface which faces a groove-shaped chip space, and a free surface at the outer circumference which converge at a drilling-out cutting edge, which extends along the tool axis. In this case in the profiling step the roughening of the inner walling and also the drilling out to the final diameter occur simultaneously.

Preferably the web height of the drilling-out web is smaller than the profiling contour height, but still large enough to ensure in the predrilled bore of the workpiece a material removal up to a final bore diameter. This means that the tool diameter at the drilling-out web is smaller than the tool diameter at the profiling contour. In the above mentioned pre-processing step (i.e., during insertion in axial direction) therefore not only a profiling groove is generated with the profiling web in the core-bore inner walling but additionally also a drilling-out groove is generated in the core-bore inner walling by means of the drilling-out web. The groove depth of the drilling-out groove is hereby smaller than the groove depth of the profiling groove.

In the following processing step the core bore is drilled out to the final diameter. The drilling-out groove introduced into the core-bore inner walling during the pre-processing step has a groove depth which corresponds to the material thickness to be removed in the subsequent final processing step. On the other hand the groove base of the profiling groove introduced during the pre-processing step has a greater diameter than the material thickness to be removed in the drilling-out step. In this case, in the manufactured state only the profiling groove and the roughened structure remains in the core-bore inner walling while the drilling-out groove has disappeared. In addition an annular ring-shaped circumferential groove is generated by the rotating groove blade in the final processing step in the interior of the workpiece bore. Depending on the intended application of the workpiece the annular groove as well as the profiling groove can for example act as ventilation channels.

The drilling-out web and the profiling web can—with the exception of the profiling contour and the different web heights—be constructed the same. Accordingly with regard to the geometry of the drilling-out web reference is made to the description of the profiling web above.

The refinements and/or embodiments of the invention described above and/or set forth in the dependent claims can be used individually or in any combination with each other—except in cases of clear dependencies or irreconcilable alternatives.

BRIEF DESCRIPTION OF THE DRAWING

In the following the invention and its advantageous refinements and embodiments and its advantages are explained by way of drawings.

It is shown in.

DETAILED DESCRIPTION OF PREFERRED EMBODIMENTS

Figure 1:
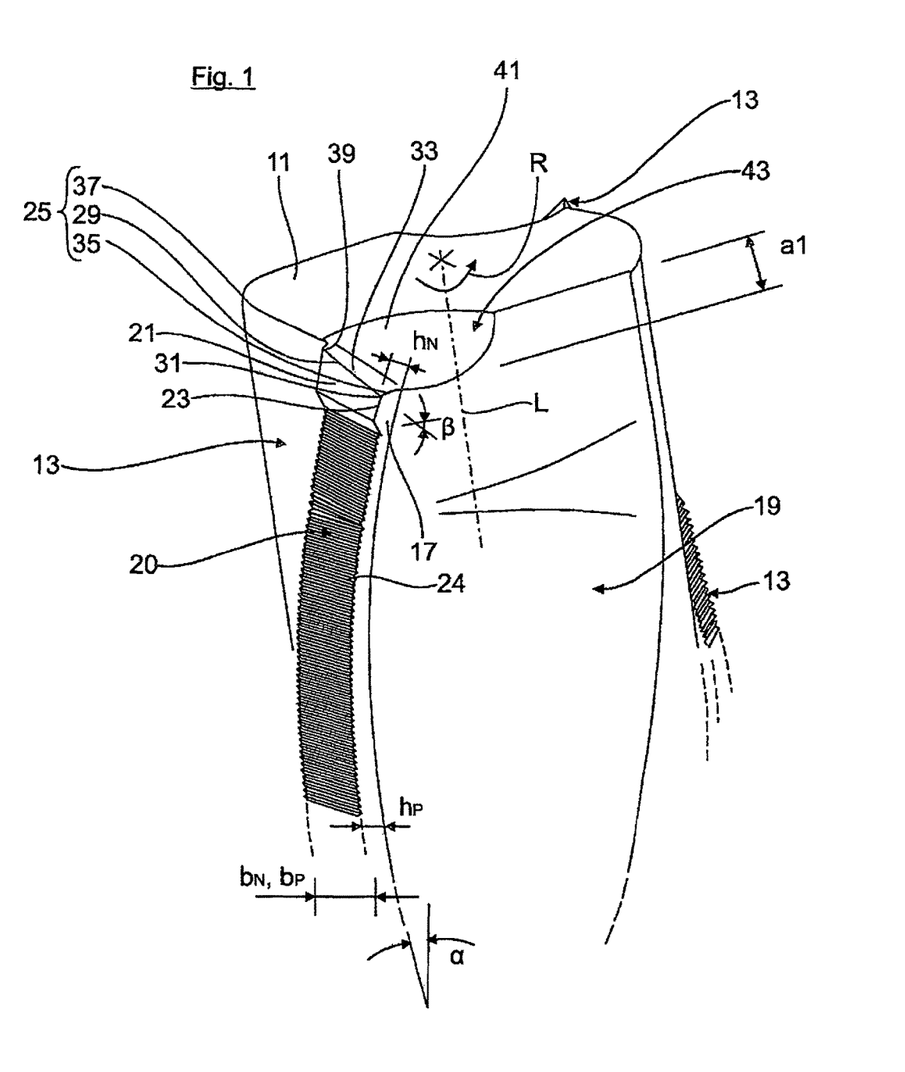
FIG. 1 an enlarged perspective view of the region on the tool tip of a roughening tool according to the first exemplary embodiment.
Figure 2:
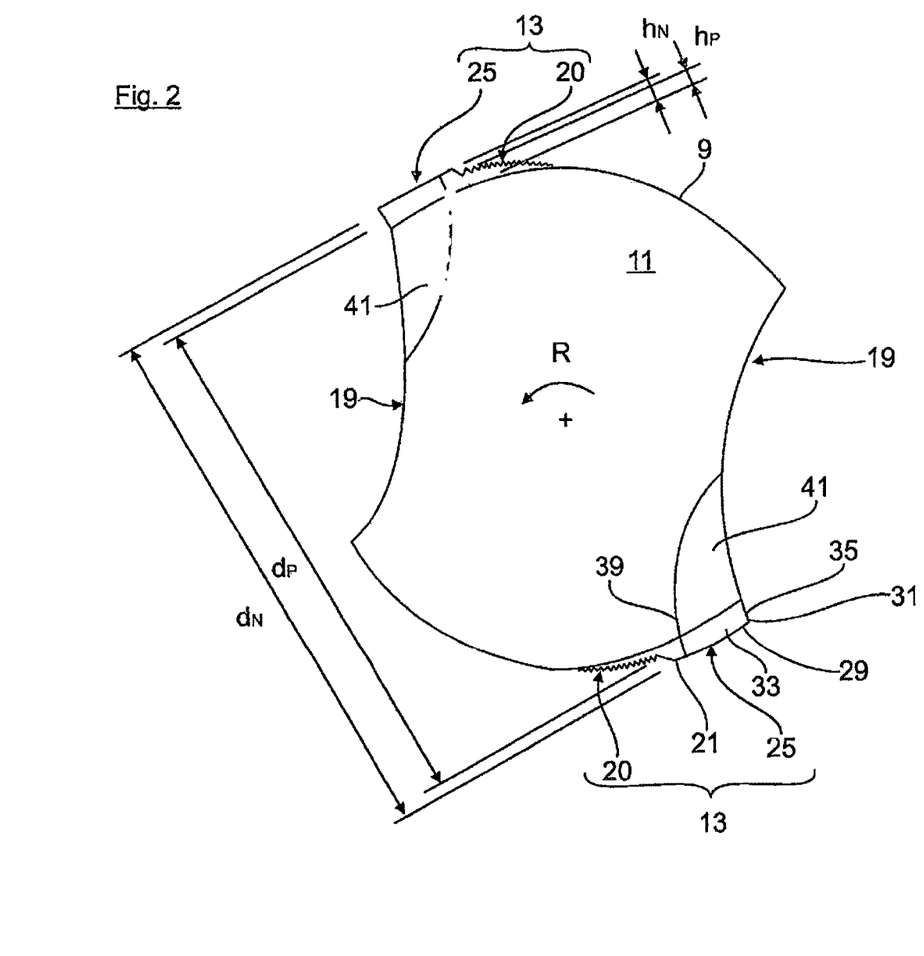
FIG. 2 a top view along the tool axis onto the tool tip of the roughening tool.
Figure 4:
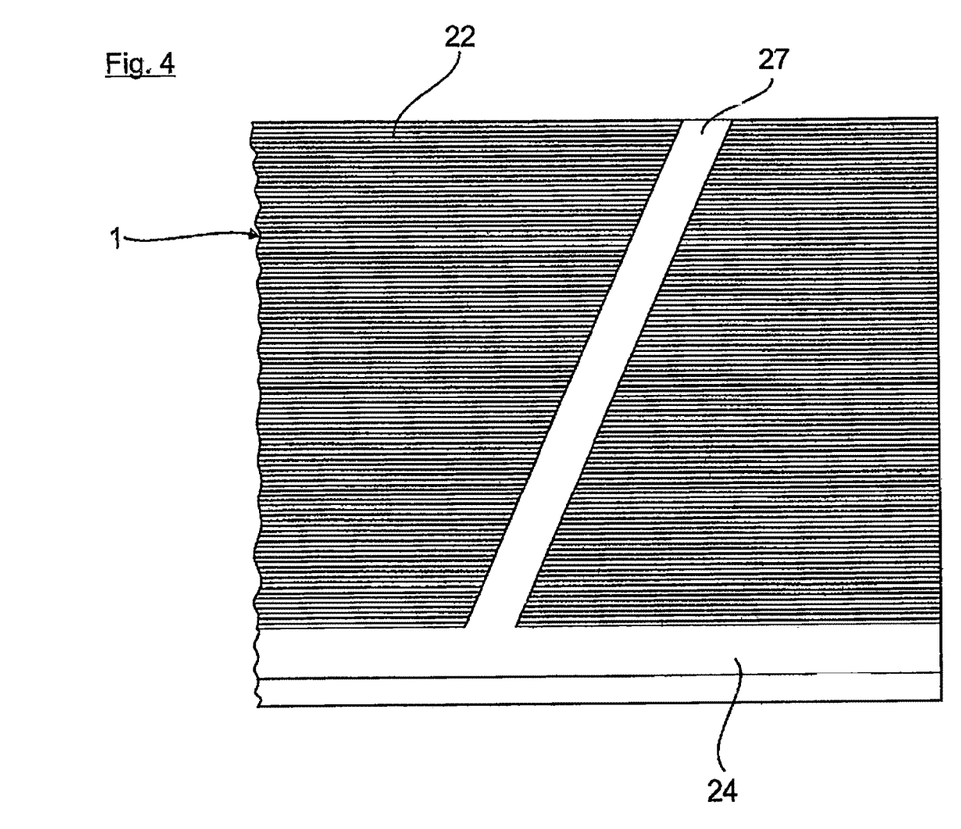
FIG. 4 a partial view of an unfolded core-bore inner walling after the performed final processing step.

FIG. 1 shows a roughening tool for roughening an inner walling 1 of a core bore 3 of a workpiece 5. The roughening tool has a not shown mounting shaft for mounting into a not shown tool chuck, and a tool body 9 adjoining the mounting shaft (FIG. 2). Extending between the flattened tool tip 11 and the mounting shaft are for example two profiling webs 13, which are diametrically opposed to each other with respect to a tool axis L and are configured point symmetric to each other. The two profiling webs 13 extend spirally with an angle of twist α about the tool axis L. Each profiling web 13 has a chip surface 17, which faces a respective groove-shaped chip space 19 and an free surface 21 at the outer circumference. The chip surface 17 and the free surface 21 of the profiling web 15 at the outer circumference converge in the region of the tool tip 11 at a profiling cutting edge 23, which extends along the tool axis L. By means of the profiling cutting edge 23 a circumferential annular groove 24, shown in FIG. 4, is generated in the inner walling 1 of the pre-drilled core bore 3 of the workpiece through tool rotation R.

At the tool tip 11 each of the profiling webs 13 ends with a groove blade 25, which is oriented transversely relative to the tool axis L. By means of the groove blade 25 the roughening tool can be inserted, in a described pre-processing step I described below, into the core bore 3 in a threading mode, i.e., with a translational lift movement h (FIG. 3) and a rotation that is adjusted to the tool angle of twist. This results in the diametrically opposed profile grooves 27 shown in FIG. 3, which extend spirally along the core-bore axis.

According to FIG. 2, the groove blade 25 has a groove base cutting edge 29. The groove base cutting edge converges at a first blade corner 31 with the profiling cutting edge 23. In addition also the outer circumferential free surface 21 of the profiling web 13 and an end-side groove chip surface 33 converge at the groove base cutting edge 29. According to FIG. 1 the groove chip surface 33 is delimited by the groove base cutting edge 29 and by a first groove wall cutting edge 35 and a second groove wall cutting edge 37. The first groove wall cutting edge 35 transitions at the already mentioned blade corner 31 into the groove base cutting edge 29. The second groove wall cutting edge 37 transitions at a second blade corner 39 into the groove base cutting edge 29.

Divergent from the situation depicted in the Figures the first groove wall cutting edge 35 and the second groove wall cutting edge 37 can be angled relative to the groove base cutting edge 29 so that each of the profile grooves 27 has a dovetail shape in which the groove side walls of the respective profile groove 27 form undercuts.

Figure 6:
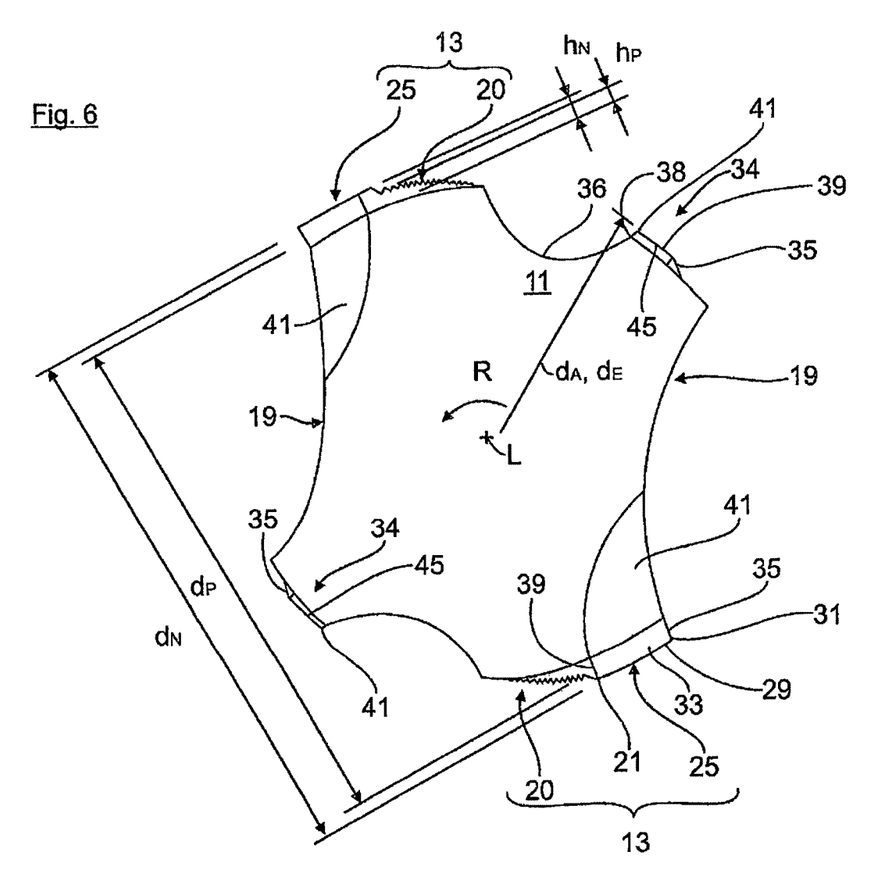
FIG. 6 a view according to FIG. 2 of a roughening tool according to the second exemplary embodiment.

As further shown in FIG. 1 a profiling contour 20 adjoins the free surface 21 of the profiling web 13 in a longitudinal extent away from the tool tip 11, with which profiling contour 20 a roughened structure 22 described in FIG. 6 is generated on the inner walling 1 of the core bore. In the further course in the direction of the mounting shaft the profiling cutting edge 23 transitions into abutment edges 24 (FIG. 1) of the profiling contour 20. The abutment edges 24 of the profiling contour 20 protrude radially outward from the tool base body 9 with a profile height $h_p$. The profile height $h_p$ is hereby smaller than the web height $h_N$ at the groove blade 25. On the other hand the web width in the region of the groove blade 25 and in the region of the profiling contour 20 is identical. As an alternative the web width in the region of the profiling contour 20 can also be smaller than the web width in the region of the groove blade 25.

According to FIG. 1 the groove base cutting edge 29 is slanted at a work angle β with respect to a plane that is perpendicular to the tool axis L. The work angle β is approximately 45° and is selected so that when viewed in the direction of rotation R the leading, first blade corner 31 is spaced apart from the tool tip 11 by a longitudinal offset $a_1$. On the other hand in FIG. 1 the second trailing blade corner 39 is oriented flush (i.e. without longitudinal offset) with the tool tip 11.

The above mentioned groove chip surface 33 of the groove blade 25 is extended radially inwards with a chip guiding surface 41. By means of the chip guiding surface 41 the chippings generated during the groove cutting are pushed into the chip space, which extends along the tool axis L. As can be seen from the Figures the chip guiding surface 41 is formed by a corner recess 43 at the transition between the tool tip and the chip space 19. The removal of the chippings, the lubrication and/or cooling is supported for example by using a coolant/lubricant which is conducted with high pressure out of the coolant outlets (not shown) in the tool tip and into the chip spaces 19 in order to transport the chippings out of the core bore 3.

Figure 3:
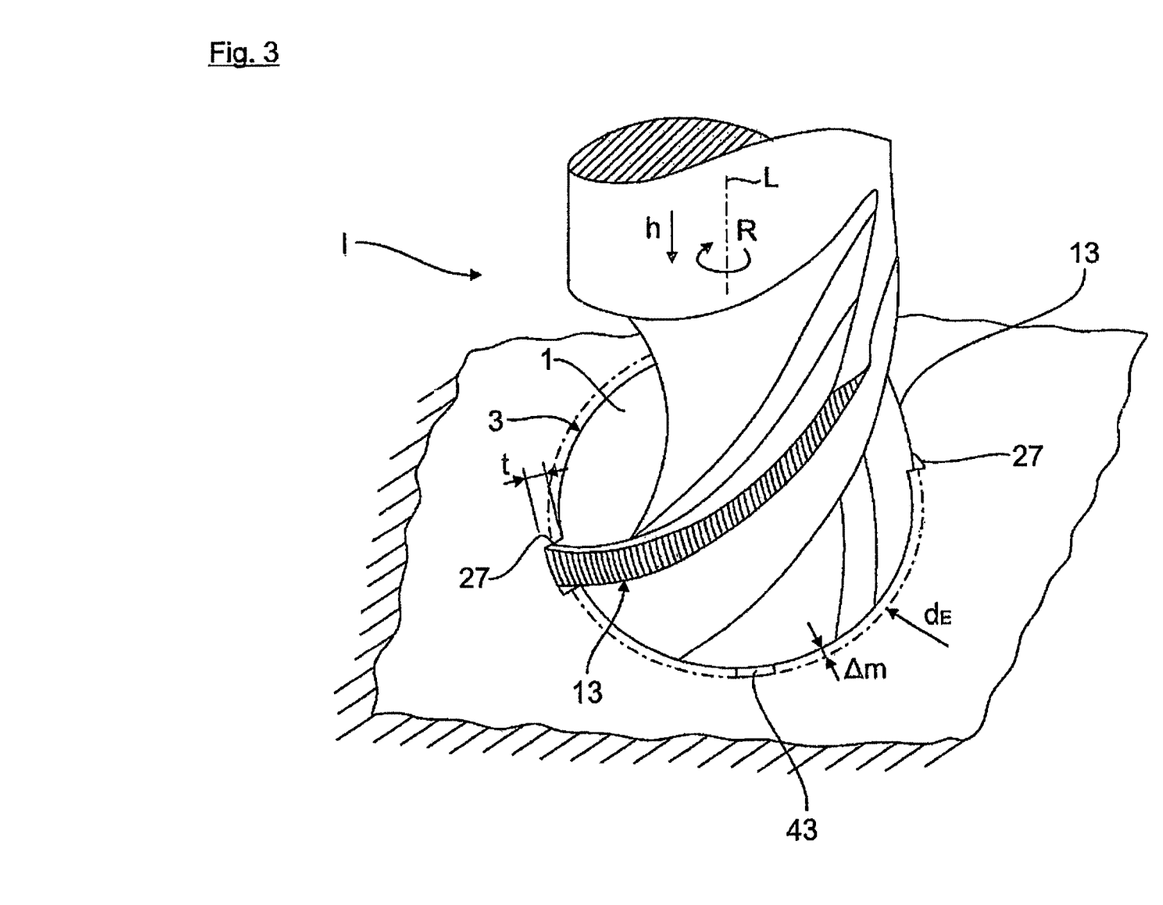
FIG. 3 a view which shows the pre-processing step, in which the tool is inserted into the pre bore while forming the profiling groove.

FIG. 3 illustrates the method for roughening the core-bore inner walling 1. Accordingly in a first pre-processing step I the tool is first inserted into the pre-drilled workpiece core probe 3 in a threading mode, i.e., with a low rotational speed and an axial lift movement h adjusted to this rotational speed. As a result the opposing spiral-shaped profiling grooves 27 are formed. Due to the geometry of the profiling web the groove depth t of the two grooves 27 is hereby configured so that its groove base is positioned radially outside the profiling contour 20.

In this way the profiling contour 20 is inserted in the preprocessing step I into the profiling grooves 27 without mechanical stress. After the formation of the two profiling grooves 27 the boring tool remains in its inserted state in which the two profiling webs 13 are in engagement with the two profiling grooves 27.

In the following final processing step II the roughening tool is then impinged with at least half a rotation (i.e. at least with a rotation angle of 180°), wherein depending on the configuration of the profiling contour 20, a material-removing or non-material-removing processing of the metallic surface of the core-bore inner walling 1 occurs. Subsequently the roughening tool is operated in the inverse threading mode for withdrawal from the core bore 1, i.e., in opposite direction of rotation.

Figure 5:
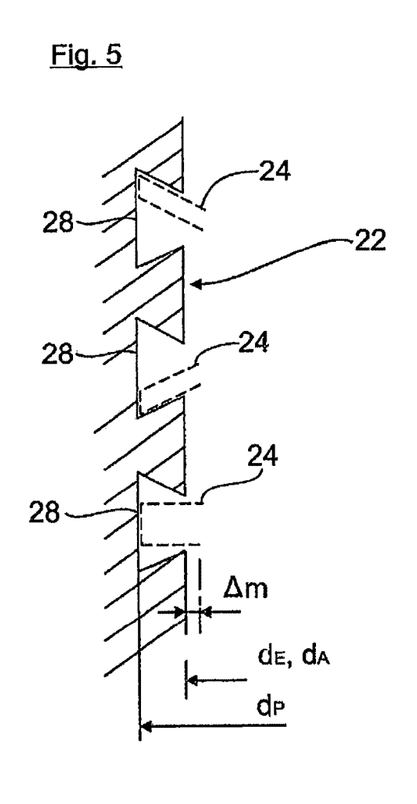
FIG. 5 a strongly enlarged schematic partial view of the roughening structure worked into the metallic surface of the inner walling of the core bore.

As shown in FIG. 2 the envelope curve diameter $d_N$ of the tool in the region of the groove blade 25 is greater that the envelope curve diameter $d_P$ in the region of the profiling contour 20. Correspondingly the roughened structure 22 shown in FIG. 4 results on the inner walling 1 of the core bore 3 after the roughening process, according to which the two profile grooves 27 extend obliquely with a groove depth along the core bore axis. On the other hand the roughened structure 22 extends perpendicular to the core bore axis. In the lower region of the unfolded view the circumferential annular groove 24 is formed, which results in the final processing step II due to the rotation of the groove blade 25. According to FIG. 5, the roughened structure 22 has for example straight extending receptacles 28 which in cross section have a dovetail shape. For forming such a dovetail shape the abutment edges 24 of the profiling contour 20 can have the geometries indicated with hatched lines in FIG. 5.

FIG. 6 shows a roughening tool according to a second exemplary embodiment, which also has two profile webs 13 that are diametrically opposed to each other with respect to the tool axis L. In addition circumferentially offset drilling-out blades 34 are provided which radially protrude from the tool base body 11. The two drilling-out blades 34 are arranged together with the profiling webs 13 with same angular distances circumferentially distributed about the outer circumference of the tool base body 9. Each of the drilling-out blades 34 has a chip surface 38, which faces a groove-shaped chip space 36 and an outer free surface 39, which is arranged on the back of the web. The chip surface 38 and the free surface 39 converge at a drilling-out cutting edge 41, which extends along the tool axis L. In addition the profiling webs 13 and the drilling-out webs 35 are each configured with the same slope in the tool.

By means of the drilling-out cutting edge the core bore 3 can be drilled out to a final diameter $d_E$ (FIGS. 3 and 6) by rotation of the drilling-out tool (i.e., in the final processing step II).

As shown in FIG. 3, in the pre-processing step I not only the profile grooves 27 but also the drilling-out grooves 43 (one is indicated with dashed lines in FIG. 3) are generated in the core-bore inner walling 1. In the following final processing step II additionally a drilling-out process is performed in which the drilling-out blade 34 drills out the core bore to the final diameter $d_E$.

What is claimed is:

1. A roughening tool for roughening a metallic surface of an inner walling of a pre-drilled workpiece bore, said roughening tool comprising:
    a profiling web protruding from a base body of the roughening tool and extending along an axis of the roughening tool, said profiling web having an outer web back provided with a profiling contour extending between a tool tip of the roughening tool and a mounting shaft of the roughening tool, said profiling web ending at the tool tip of the roughing tool with a groove blade, which is oriented transverse to the axis of the roughening tool,
    said groove blade being adapted to enable insertion of the roughening tool into pre-drilled workpiece bore with an axial lift movement, and during said lift movement to form a profiling groove in the inner walling of the pre-drilled workpiece bore, said profiling groove extending along the longitudinal axis of the core bore,
    said profiling web being adapted to engage in the profiling groove and through rotation of the roughening tool to generate the roughened structure by material-removing or non-material removing processing of the metallic surface of the inner walling of the pre-drilled workpiece bore, when received in the profiling groove and upon rotation of the roughening tool.

2. The roughening tool of claim 1, wherein a first diameter of the roughening tool at the groove blade is greater than a second diameter of the roughening tool at the profiling contour.

3. The roughening tool of claim 1, wherein a first tool diameter of the roughening tool at the groove blade is equal to a second tool diameter of the roughening tool at the profiling contour.

4. The roughening tool of claim 1, wherein the groove blade has a groove-base cutting edge, which converges at a first blade corner with a profiling cutting edge which extends along the tool axis.

5. The roughening tool of claim 1, wherein the groove blade has a first groove-wall cutting edge and a second groove-wall cutting edge, said first and second groove-wall cutting edge being angled with respect to the groove base cutting edge so that the profile groove formed in the workpiece has a dovetail shape in which side walls of the profile groove form undercuts.

6. The roughening tool of claim 1, wherein the profiling web at least in a region of the tool tip has at least one of a chip surface, which faces a groove shaped chip space, and a free surface provided on the web back.

7. The roughening tool of claim 6, wherein the at least one chip surface and the free surface converge at the profiling cutting edge.

8. The roughening tool of claim 6, wherein a groove-chip surface is formed on the end side of the tool tip, and wherein the free surface and the groove-chip surface converge at a groove base cutting edge of the groove blade.

9. The roughening tool of claim 8, wherein the groove chip surface formed at the tool tip is delimited by the groove base cutting edge and by a first and a second groove-wall cutting edge of the groove blade, which each transition at a first and a second blade corner of the groove blade into the groove base cutting edge.

10. The roughening tool of claim 1, wherein the profiling web extends with an angle of twist spirally about the tool axis, and wherein in particular the profiling groove is formable so as to extend spirally in the inner walling of the core bore with the axial lift movement and a rotational movement of the roughening tool which is adjusted to the angle of twist.

11. The roughening tool of claim 6, wherein the groove chip surface of the groove blade is extended radially inwards with a chip guiding surface formed on the end side of the tool, said chip guiding surface being adapted to push chippings generated during cutting of the profile groove into the chip space which extends along the tool axis.

12. The roughening tool of claim 1, further comprising at least one drilling-out blade protruding radially from the tool base body and extending along the tool axis.

13. The roughening tool of claim 12, wherein the drilling-out blade has at least one drilling-out web, said at least one drilling-out web having a chip surface which faces a groove shaped chip space of the roughening tool, and an outer free surface, said chip surface and said outer free surface converging at a drilling-out cutting edge of the drilling out blade, said drilling-out cutting edge extending along the tool axis, and being adapted to drill out the core bore to a final diameter through rotation of the roughening tool.

14. The roughening tool of claim 13, wherein the drilling-out web terminates at the tool tip with another groove blade, said another groove blade being adapted to generate a drilling-out groove in the inner walling of the core bore during the axial lift movement prior to drilling the core bore to the final diameter, said drilling-out blade during the axial lift movement engaging in the drilling-out groove and upon rotation of the roughening tool drilling out the core bore to the final diameter.

15. The roughening tool of claim 14, wherein the profiling web and the drilling-out web are configured with a same slope.

16. The roughening tool of claim 14, wherein a diameter of a back of the drilling-out web is greater than a diameter of the core bore and smaller than a diameter of the profiling contour.

17. A method for roughening a metallic surface of an inner walling of a pre-drilled core-bore of a workpiece, said method comprising:
    providing a roughening tool which comprises a profiling web protruding from a base body of the roughening tool and extending along an axis of the roughening tool, said profiling web having an outer web back provided with a profiling contour extending between a tool tip of the roughening tool and a mounting shaft of the roughening tool, said profiling web ending at the tool tip of the roughing tool with a groove blade, which is oriented transverse to the axis of the roughening tool;

in a pre-processing step inserting the roughening tool into the pre-drilled core bore of the workpiece in an axial lift movement, and during the axial lift movement forming with the groove blade a profiling groove in the inner walling of the core bore, said profiling groove extending along an axis of the core-bore; and in a final processing step, with the profiling web of the roughening tool being arranged in the profiling groove, rotating the roughening tool, whereby the profiling web processes the metal surface in a material removing or non-material removing manner thereby generating a roughened structure.

18. The method of claim 17, further comprising in the pre-processing step forming with a further groove blade provided on a drilling-out web of the roughening tool a drilling-out groove in the inner walling of the core-bore, and in the final processing step with a drilling-out blade of the drilling-out web drilling out the core bore to a final diameter through rotation of the roughening tool.

\* \* \* \* \*